United States Patent [19]
May et al.

[11] Patent Number: 5,694,508
[45] Date of Patent: Dec. 2, 1997

[54] BEAM WAVEGUIDE PLUG

[75] Inventors: Guntram May, Altdorf; Martin Besler, Nürnberg, both of Germany

[73] Assignee: Framatome Connectors International, Paris, France

[21] Appl. No.: 699,207

[22] Filed: Aug. 19, 1996

Related U.S. Application Data

[63] Continuation of Ser. No. 411,281, Mar. 27, 1995, abandoned.

[30] Foreign Application Priority Data

Mar. 25, 1994 [DE] Germany ............... 44 10 444.8

[51] Int. Cl.⁶ ............................................. G02B 6/36
[52] U.S. Cl. ................................... 385/81; 385/87
[58] Field of Search ...................... 385/62, 54, 66, 385/69, 76, 81, 84, 86, 87, 136, 92

[56] References Cited

U.S. PATENT DOCUMENTS 4,711,521 12/1987 Thillays ................... 385/92

FOREIGN PATENT DOCUMENTS

| 26 28 747 | 1/1977 | Germany . | |
|---|---|---|---|
| 37 80 481 | 2/1993 | Germany . | |
| 60-186811 | 9/1985 | Japan | 385/81 |
| 2 040 062 | 8/1980 | United Kingdom . | |

*Primary Examiner*—John Ngo
*Attorney, Agent, or Firm*—Pollock, Vande Sande & Priddy

[57] ABSTRACT

This invention relates to a beam waveguide plug comprising: a plug casing (5) which has for each beam waveguide cable (2) a plug segment (6) and a clamping segment (7) for fixing the beam waveguide cable (2) to the plug (1). The clamping segment (7) has a socket (15) with a plurality of serrations (8) pressed by their edges into the beam waveguide sheathing and extending substantially transversely of the beam waveguide axis, and recesses (9) disposed between the serrations (8), to accommodate (15) the sheathing material displaced by the searrations.

13 Claims, 2 Drawing Sheets

BEAM WAVEGUIDE PLUG

This application is a File Wrapper Continuation application of U.S. patent application Ser. No. 08/411,281, filed Mar. 27, 1995, abandoned.

This invention relates to a beam waveguide plug in accordance with the preamble of claim 1. Beam waveguide plugs of this kind are required to connect beam waveguide cables to equipment in which the light signals are converted, amplified, transmitted or processed. Beam waveguide plugs are required in large numbers in systems operating with light signals, so that if it is possible to reduce the costs of manufacture of such plugs it will have a considerable effect on the overall costs of such a system. To enable a large number of plugs to be accommodated in the minimum amount of space the plugs must not occupy too much space. Also, they must be of robust design for frequent plug-in and pull-out loading, and ensure high resistance to tearing out.

In addition, the precision of construction, and particularly the contact of the end face of the beam waveguide on a corresponding companion element, are required to meet high specifications in order not to cause attenuation losses in the beam waveguide core end.

A number of different methods have already been adopted to solve the above requirements. For example, multi-part metal beam waveguide plugs are known which are similar in construction to coaxial cables known in electronics. Their construction from a plurality of parts screwed together by way of screwthreads is very complicated and miniaturisation is practically impossible because of the fact that the screw connections are not easy to handle.

In addition, plastic beam waveguide plugs are known wherein the cable end is partially stripped, the stripped part is passed through a bore in defined relationship as far as the front end of the plug, and wherein the plug is secured to the cable in the rear part of the plug. In a known beam waveguide plug system this fixing is by means of double clamping yokes made of metal, which are inserted into slots provided for the purpose in the plug casing in order to pinch or cut into the sheathing of the beam waveguide cable between their limbs, at two spaced points of the cable. The disadvantage of these plugs is that they consist of a plurality of parts, and this renders production expensive, limits miniaturisation as a result of the metal clamps, while in addition the high pinching stress on the beam waveguide core at the clamping points does not prevent changes of the interface layer between the core and the sheathing such as is essential for multiple reflection and hence light transport, and consequently attenuation losses occur.

The object of this invention is so to improve a beam waveguide plug of the kind according to the preamble as to require considerable tear-out forces, make it inexpensive to manufacture, highly suitable for miniaturisation, while preventing any adverse effect on the optical properties of the beam waveguide in the plug zone.

This problem is solved by the claims.

The subclaims refer to preferred embodiments of the beam waveguide plug according to the invention.

The beam waveguide plug is preferably made in one piece from plastics, this having a positive influence on costs and ease of handling.

Clamping is distributed over a relatively large zone of the beam waveguide cable outer surface, thus guaranteeing high tear-out forces while providing non-damaging support.

The construction of the beam waveguide plugs according to the invention allows rational and, if required, automated or manual cable installation.

The invention is explained in detail below with reference to one exemplified embodiment and the drawing, the exemplified embodiment having no limiting force. In the drawing:

FIG. 1 illustrates one embodiment of a beam waveguide plug according to the invention.

Figure 1:
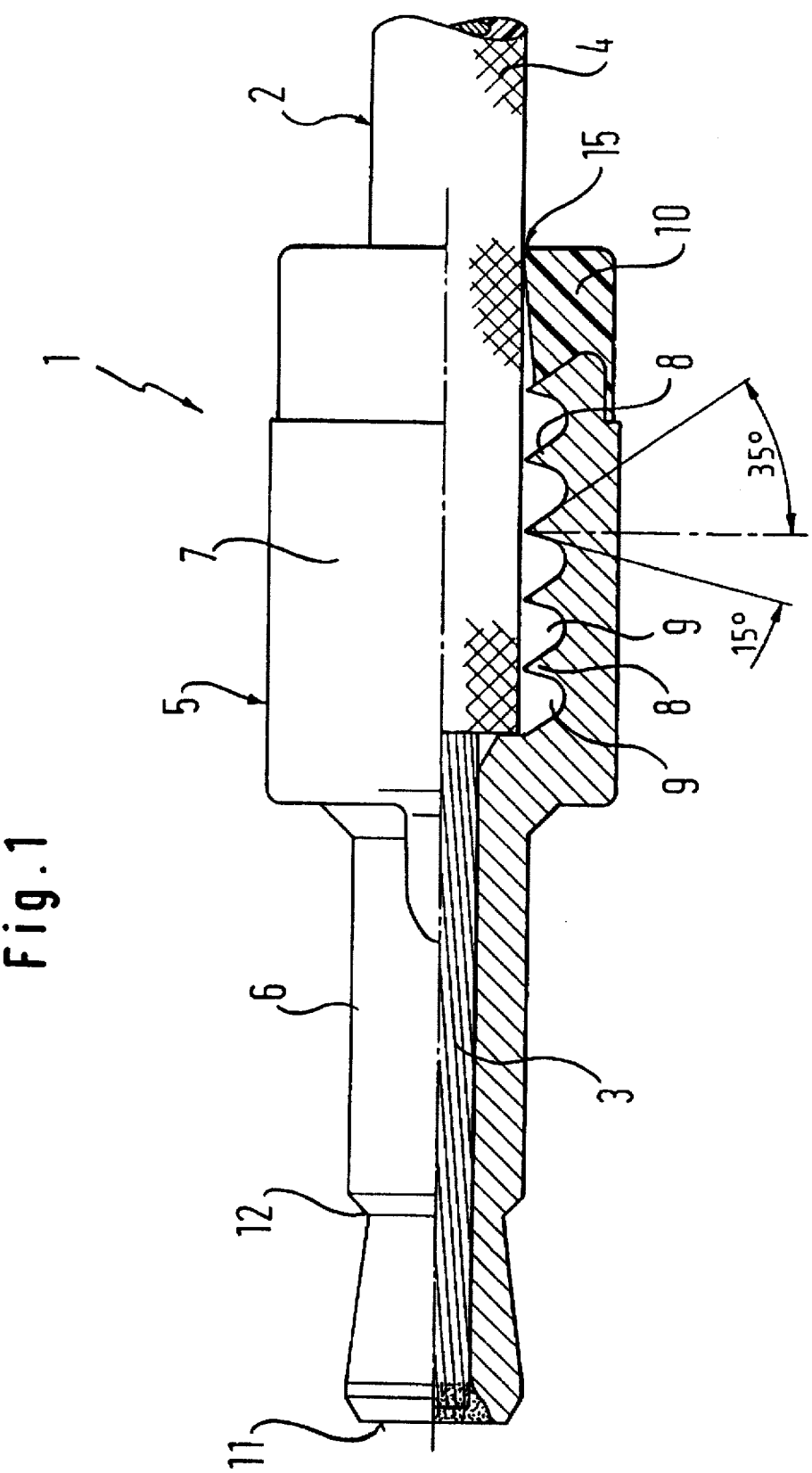
FIG. 1 is a partial longitudinal section of one exemplified embodiment of the beam waveguide plug according to the invention in the uncrimped condition.

The right-hand part of the drawing shows a sheathed beam waveguide cable 2 onto which the plug is pushed. Its end zone is stripped. The stripped fibre core 3 is taken as far as the end of the plug 1 through a cylindrical opening in the segment 6 thereof. Here the core end is fused positively by hot plate technique to the plug 1, which widens out at the plug segment end 6. This also increases the tensile strength of the plug connection.

In this exemplified embodiment the plug segment 6 is tubular so that its outer surface is also cylindrical.

Clamping elements are provided in the clamping segment 7 of the beam waveguide plug, on the inner wall situated opposite the surface of the beam waveguide cable sheathing 4. In longitudinal section these clamping elements constitute a serration 8. The serration 8 may be in the form of a screwthread, and this gives certain advantages in the removal of the cast plug 1 from the mould, but it may also consist of concentric ribs or rib segments.

The important point is that crimping of the clamping segment 7 on the beam waveguide sheathing 4 results in a pinching of the sheath material at a number of places distributed over the sheath surface 4 of the beam waveguide cable, the peripheral material displaced by the serration 8 being capable of accommodation in sufficiently large recesses 9 between the serrations 8.

It is also advantageous to make the flanks of the serration 8 asymmetrical in respect of inclination transversely of the cable axis. In this way greater retaining forces are achieved if the flank of each serration rib 8 situated towards the head end of the plug 1 occupies a small angle transversely of the cable axis, whereas the corresponding angle on the side towards the cable is advantageously larger. A value of about 15° has proved satisfactory for the first angle and about 35° for the second angle.

Figure 2:
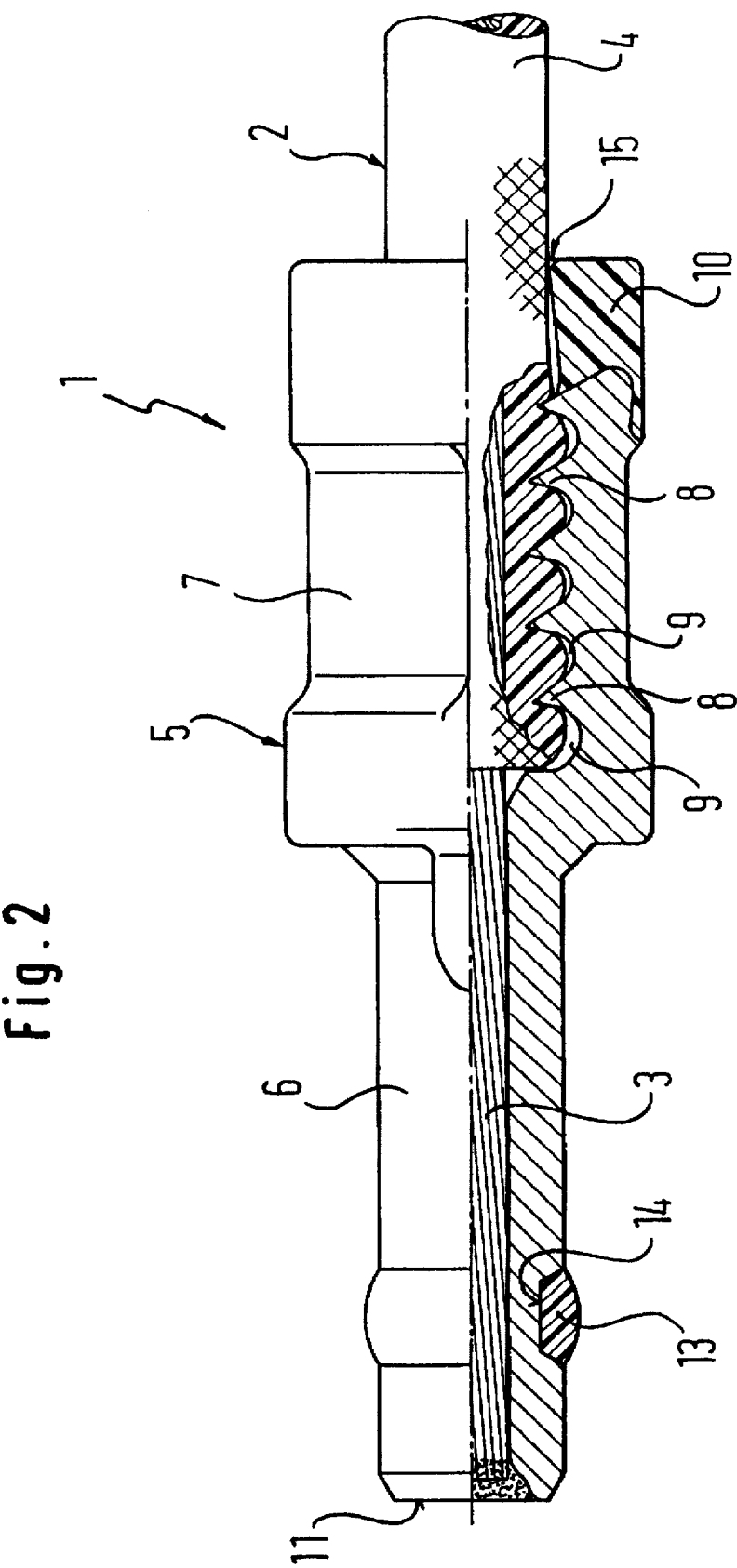
FIG. 2 shows the beam waveguide plug of FIG. 1 after crimping.

FIG. 2 shows the plug 1 of FIG. 1 after crimping. This means that an appropriate tool has constricted the plug material in the clamping segment 7 either by cross-crimping or hexagonal crimping. It will be clearly seen that the material of the sheathing 4 has been displaced by the tips of the burrs of the serrations 8 and has been bulgingly displaced into the recesses 9 between the ribs. The large number of points of engagement of the serrations 8 on the surface 4 of the sheathing causes a pressure distributed over a relatively large area to be applied to the cable sheath 4, thus avoiding intensely local pinching effects which might be transmitted from the sheath 4 to the core 3.

In the exemplified embodiment illustrated, a silicone spring 10 is positively applied to the cable entry end of the plug 1. In a casing (not shown), it serves to ensure that the end face of the plug 11 is pressed onto an appropriate contact surface by bearing against a corresponding back wall.

Sealing rings 13 can be recessed into grooves 14 provided for the purpose on the plug segment 6, which is cylindrical here, or a groove 12 with flat side walls can be provided to form the plug 1 as a jack plug. The above-described embodiment of the beam waveguide plug according to the invention is particularly suitable for production from plastic material by injection moulding. However, it is also possible to make such plugs from not too hard a metal, e.g. brass, particularly in the case of advanced miniaturisation. Here again cimping is possible.

Instead of crimping, it is also possible to make the accommodation in the clamping segment so that it opens frusto-conically towards the cable and to provide a self-tapping screwthread as the serration 8, so that the partially stripped cable ends can be screwed to the beam waveguide plug. Since it is a simple matter to perform this screwing operation by hand without the need for any tools, a construction of this kind is particularly suitable for applications requiring ease of handling. Self-tapping screwthreads of this kind also have the advantage that a plug can also easily be removed from the cable end simply by unscrewing.

The present invention is equally suitable for multiple plugs in which two or more beam waveguide cables are mounted side by side in a plug casing.

I claim:

1. A beam waveguide plug comprising:
   (a) a plug casing including a substantially cylindrical plug segment and a one-part clamping segment for fixing a beam waveguide cable to said plug, said plug segment and said clamping segment being made in one piece;
   (b) said clamping segment comprising a socket with a plurality of serrations having edges permanently pressed by a crimping tool into a sheathing of said beam waveguide cable and extending substantially transversely of an axis of the beam waveguide, such that said serrations remain in crimped condition even after removal of said crimping tool; and
   (c) said serrations being separated by recesses to accommodate sheathing material displaced by said crimping means.

2. A beam waveguide plug according to claim 1, wherein said plug casing is made of plastic.

3. A beam waveguide according to claim 1, wherein said plug casing is made of metal.

4. A beam waveguide according to claim 1, wherein said serrations and recesses constitute an internal screwthread formed in said socket.

5. A beam waveguide plug according to claim 4, wherein said screwthread is a self-tapping screwthread disposed on a frustoconical socket opening widening out towards a rear portion of said plug.

6. A beam waveguide plug according to claim 1, wherein an opening of said socket is crimped by said crimping means after introduction of said beam waveguide cable.

7. A beam waveguide plug according to claim 1, wherein said serrations have a substantially triangular cross-section, a surface of said serrations facing a head of said plug being inclined by an angle of approximately 15° transversely to said axis of said beam waveguide and by an angle of about 35° between side surfaces of successive serrations.

8. A beam waveguide plug according to claim 1, wherein said serrations are disposed on circles concentric to said axis of said beam waveguide and at least partly enclose an inner periphery of said socket.

9. A beam waveguide plug according to claim 6, wherein said clamping segment has a cylindrical outer surface and said crimping means effects hexagonal or cross-crimping.

10. A beam waveguide plug according to claim 1, comprising a silicone spring or anti-buckle bush positively secured to a cable end of said plug.

11. A beam waveguide plug according to claim 1, wherein said plug segment is cylindrical and a core end of said beam waveguide is positively adapted by a hot plate technique to a widening of an inside diameter of said plug segment.

12. A beam waveguide plug according to claim 1, comprising a detenting groove on said plug segment forming a jack plug.

13. A beam waveguide plug according to claim 1, comprising a sealing ring disposed in a groove on said plug segment.

* * * * *